United States Patent
Gibson et al.

(10) Patent No.: US 10,624,334 B1
(45) Date of Patent: Apr. 21, 2020

(54) SELF-STABILIZING DECOY SYSTEM

(71) Applicants: Eric M. Gibson, Fate, TX (US); Blake Lierman, Fate, TX (US)

(72) Inventors: Eric M. Gibson, Fate, TX (US); Blake Lierman, Fate, TX (US)

( * ) Notice: Subject to any disclaimer, the term of this patent is extended or adjusted under 35 U.S.C. 154(b) by 222 days.

(21) Appl. No.: 15/461,265

(22) Filed: Mar. 16, 2017

Related U.S. Application Data

(60) Provisional application No. 62/309,322, filed on Mar. 16, 2016.

(51) Int. Cl.
*A01M 31/06* (2006.01)

(52) U.S. Cl.
CPC .................................. *A01M 31/06* (2013.01)

(58) Field of Classification Search
CPC ...................................................... A01M 31/06
USPC ..................................... 43/2–3; 446/153–155
See application file for complete search history.

(56) References Cited

U.S. PATENT DOCUMENTS

| | | | | |
|---|---|---|---|---|
| 2,201,164 A | * | 5/1940 | Fox ........................ | A01M 31/06 43/3 |
| 2,391,475 A | * | 12/1945 | Newhardt ............. | A01M 31/06 43/3 |
| 6,339,895 B1 | * | 1/2002 | Lawson ................ | A01M 31/06 43/3 |

* cited by examiner

*Primary Examiner* — Darren W Ark
*Assistant Examiner* — Steven J Shur
(74) *Attorney, Agent, or Firm* — Richard Eldredge

(57) ABSTRACT

A fowl decoy is detailed having a buoyant upper shaped and decorated to approximate a fowl. The upper is attached to a funnel shaped stabilizer that extends downward from the bottom surface of the buoyant upper. The funnel improves the movement of the decoy by lowering the center of mass and allowing water to move the decoy about by force applied to the lower portion of the stabilizer. The decoy is also equipped with an anchor to facilitated removal from the water.

2 Claims, 3 Drawing Sheets

SELF-STABILIZING DECOY SYSTEM

BACKGROUND

1. Field of the Invention

The present invention relates generally to floating decoy systems, and more specifically, to a self-stabilizing decoy system for presenting a lifelike representation of a fowl.

2. Description of Related Art

Floating decoy systems are well known in the art and are effective means to lure and/or attract water fowls. For example, FIG. 1 depicts a conventional floating decoy system 101 having a fowl shaped buoyant upper 103 and a weighted rudder 105. During use, the upper and its rudder are set in a pond or lake to attract like fowls.

One of the problems commonly associated with system 101 is its limited function. For example, when sitting on the water the decoy does not move in a life-like manner, it pitches, bounces and is pushed about in primarily linear movements contrary to the random movements of live fowl.

Accordingly, although great strides have been made in the area of floating decoy systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
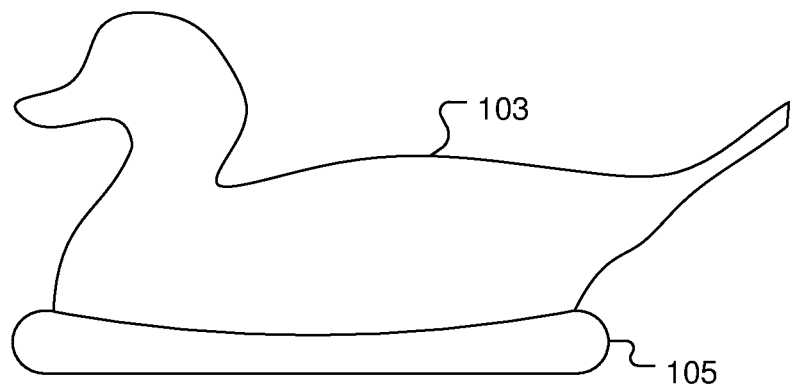
FIG. 1 is a side view of a common floating decoy system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional floating decoy systems. Specifically, the system of the present application provided for a decoy that approximates the natural and random movements of a living fowl upon a body of water. This and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
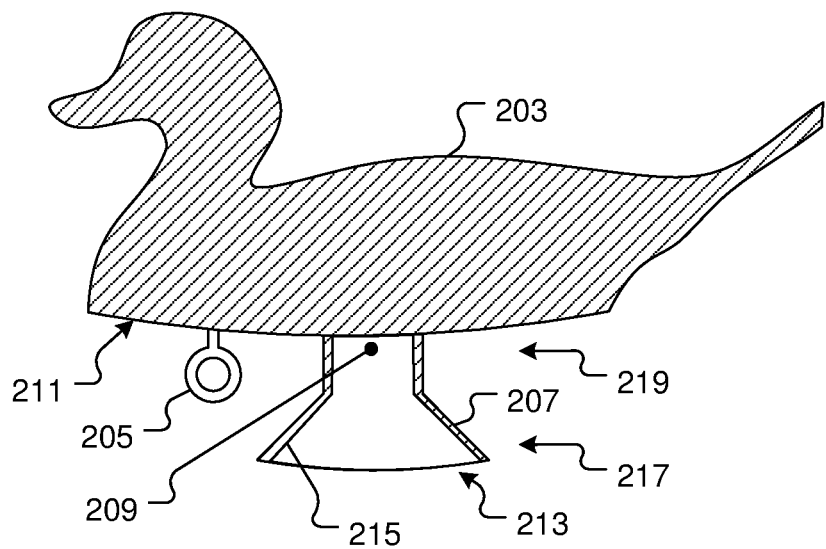
FIG. 2 is a cross-sectional side view of a self-stabilizing decoy system in accordance with a preferred embodiment of the present application.

Referring now to the drawings wherein like reference characters identify corresponding or similar elements throughout the several views, FIG. 2 depicts a cross-sectional side view of a self-stabilizing decoy system in accordance with a preferred embodiment of the present application. It will be appreciated that system 201 overcomes one or more of the above-listed problems commonly associated with conventional floating decoy systems.

In the contemplated embodiment, system 201 includes a buoyant fowl-like upper 203 rigidly attached to a funnel-shaped stabilizer 207 that is configured to lower the center of mass 209 of the system 201.

The buoyant upper 203 includes an anchor 205 rigidly attached to the bottom surface 211. The anchor 205 is configured to enable a user to remove the system 201 from a body of water.

The stabilizer 207 having an open end 213 that allows water to enter a funnel shaped compartment 215. The shape of the stabilizer enables the motion of the water to act on the lower portions 217 while flowing past the upper portion 219 further simulating life-like movement of the system 201.

In use the system 201 is placed into the water and kept afloat via the buoyant upper 203, anchor 205 provides the user with a means for retrieval, and the funnel stabilizer 207 enables the system to better approximate the life-like movements of live waterfowl.

It should be appreciated that one of the unique features believed characteristic of the present application is that the funnel shape of stabilizer 207 enables the system 201 to simultaneously minimize decoy tilting or wobbling by lowering the center of gravity 209 while promoting random planar movements over the surface of water. (See FIG. 3).

Figure 3:
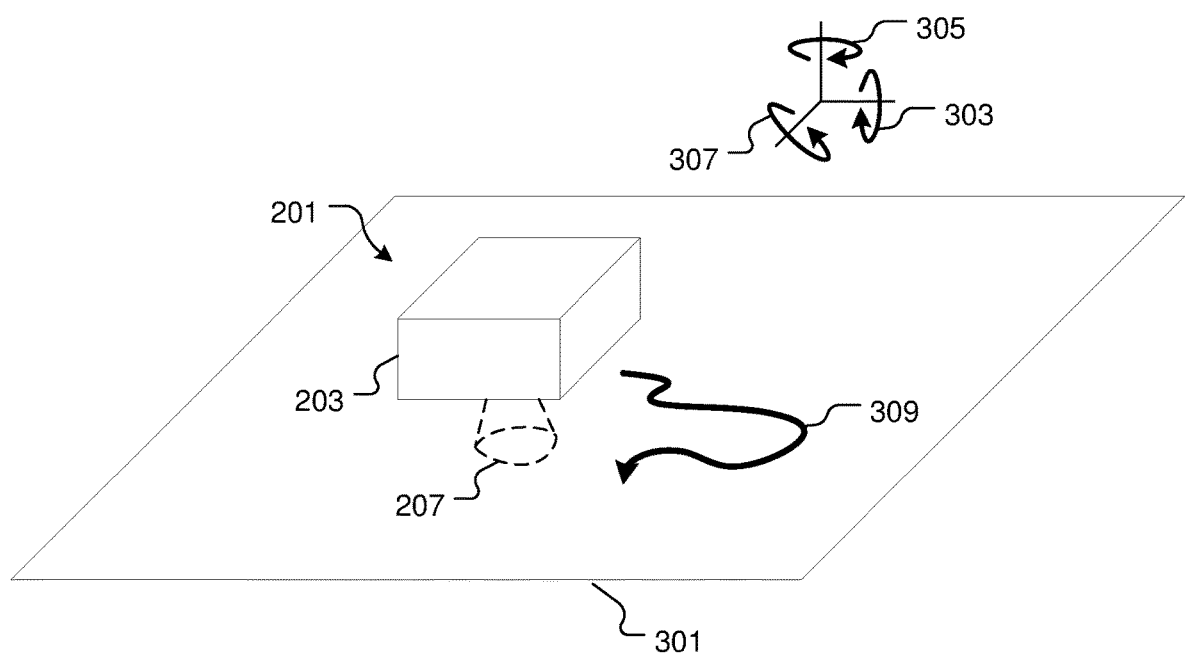
FIG. 3 is a simplified perspective view of the system FIG. 2 in use.

Referring now to FIG. 3, a simplified perspective view of system 201 is shown comprising the buoyant upper 203 and funnel-shaped stabilizer 207 as it moves through a body of water 301. It is understood and will be appreciated that funnel-shaped stabilizer 207 minimizes the pitch 303, yaw 305, and roll 307 of the system by lowering the center of gravity 209 while promoting a random planar movement 309 of the system over the surface of the body of water 301.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A self-stabilizing decoy system comprising:
   a buoyant upper body configured to replicate a fowl; and
   a funnel-shaped stabilizer secured to a bottom surface of the buoyant upper body, the funnel-shaped stabilizer consisting of:
      a single body attached directly to and extending away from the bottom surface and having:
         a first section forming a wide funnel end, the wide funnel end decreasing in diameter from a first diameter to a second diameter, the first diameter being furthest away from the bottom surface; and
         a second section forming a narrow funnel end which has a third diameter equal to the second diameter and abutted to extending away from the bottom surface of the buoyant upper body, the narrow funnel end abutting the bottom surface of the buoyant upper body such that the bottom surface of the buoyant upper body extends across the narrow funnel end;
   wherein the funnel-shaped stabilizer is rigidly attached to the buoyant upper body;
   wherein water flows past the second section and acts on the first section to cause movement of the buoyant upper body and the funnel-shaped stabilizer lowers a center of mass of the system; and
   wherein an impact of the water outside the funnel-shaped stabilizer generates a random series of movements on the buoyant upper body.

2. The system of claim 1 further comprising an anchor rigidly attached to the bottom surface of the upper body.

* * * * *